US008290802B2

(12) United States Patent  
Pirtle et al.

(10) Patent No.: US 8,290,802 B2
(45) Date of Patent: Oct. 16, 2012

(54) SYSTEM AND METHOD FOR PRODUCT DEPLOYMENT AND IN-SERVICE PRODUCT RISK SIMULATION

(75) Inventors: Randall Pirtle, Chandler, AZ (US); Richard Foley, Chandler, AZ (US); Amarnath Subrahmanya, Karnataka (IN); Prakash Subramonian, Karnataka (IN); Sandeep Baliga, Karnataka (IN); Ramji Sethu, Tamilnadu (IN); Nitesh Lall, Madhya Pradesh (IN)

(73) Assignee: Honeywell International Inc., Morristown, NJ (US)

( * ) Notice: Subject to any disclaimer, the term of this patent is extended or adjusted under 35 U.S.C. 154(b) by 798 days.

(21) Appl. No.: 12/366,401

(22) Filed: Feb. 5, 2009

(65) Prior Publication Data
US 2010/0198635 A1 Aug. 5, 2010

(51) Int. Cl.
*G06Q 10/00* (2012.01)
*G06Q 40/00* (2012.01)
(52) U.S. Cl. ..................... 705/7.11; 705/7.41
(58) Field of Classification Search .............. 705/7.11, 705/7.41
See application file for complete search history.

(56) References Cited

U.S. PATENT DOCUMENTS

| | | | |
|---|---|---|---|
| 5,822,218 A | 10/1998 | Moosa et al. | |
| 5,931,877 A | 8/1999 | Smith et al. | |
| 6,292,806 B1 | 9/2001 | Sandifer | |
| 6,338,045 B1 | 1/2002 | Pappas | |
| 6,408,258 B1 | 6/2002 | Richer | |
| 6,487,479 B1 | 11/2002 | Nelson | |
| 6,567,729 B2 | 5/2003 | Betters et al. | |
| 6,684,349 B2 | 1/2004 | Gullo et al. | |
| 6,738,931 B1* | 5/2004 | Osborn et al. | 714/37 |
| 6,799,154 B1 | 9/2004 | Aragones et al. | |
| 6,804,589 B2* | 10/2004 | Foxford et al. | 701/29 |
| 6,816,798 B2 | 11/2004 | Pena-Nieves et al. | |
| 6,832,205 B1 | 12/2004 | Aragones et al. | |
| 6,901,377 B1 | 5/2005 | Rosenfeld et al. | |
| 6,909,994 B2 | 6/2005 | Johnson et al. | |
| 7,107,491 B2 | 9/2006 | Graichen et al. | |
| 7,113,838 B2 | 9/2006 | Funk et al. | |
| 7,197,430 B2 | 3/2007 | Jacques et al. | |
| 7,359,777 B2 | 4/2008 | Betters et al. | |
| 7,373,559 B2 | 5/2008 | Guha | |
| 7,401,263 B2 | 7/2008 | Dubois, Jr. et al. | |
| 7,440,906 B1 | 10/2008 | Wetzer et al. | |
| 7,502,787 B2 | 3/2009 | Bailey et al. | |

(Continued)

OTHER PUBLICATIONS

Weibull.com (Crow-AMSAA, Aug. 10, 2007) retreived from http://web.archive.org.*

(Continued)

*Primary Examiner* — Beth V Boswell
*Assistant Examiner* — Folashade Anderson
(74) *Attorney, Agent, or Firm* — Ingrassia Fisher & Lorenz, P.C.

(57) ABSTRACT

Methods and systems are provided for predicting the reliability of a plurality of products that will be deployed during a product deployment period comprising a plurality of time intervals. The method comprises retrieving historical product removal data from a product removal data source, retrieving historical product shipment data from a product shipment data source, identifying a plurality of Weibull parameters based on at least a portion of retrieved product removal data and product shipment data, and performing a plurality of product deployment simulations, wherein each product deployment simulation includes predicting a lifespan for each of the plurality of products and determining reliability metrics for uniform time intervals during the product deployment period.

9 Claims, 6 Drawing Sheets

U.S. PATENT DOCUMENTS

| | | | |
|---|---|---|---|
| 7,548,802 B2* | 6/2009 | Avery et al. | 701/35 |
| 7,689,329 B2 | 3/2010 | Avery et al. | |
| 7,715,943 B2 | 5/2010 | Loda | |
| 7,761,201 B2 | 7/2010 | Avery et al. | |
| 2001/0032103 A1 | 10/2001 | Sinex | |
| 2002/0010532 A1 | 1/2002 | Sinex | |
| 2002/0078403 A1 | 6/2002 | Gullo et al. | |
| 2002/0138311 A1 | 9/2002 | Sinex | |
| 2002/0143445 A1 | 10/2002 | Sinex | |
| 2003/0033260 A1 | 2/2003 | Yashiro et al. | |
| 2003/0055812 A1 | 3/2003 | Williams et al. | |
| 2003/0061104 A1 | 3/2003 | Thomson et al. | |
| 2003/0069659 A1 | 4/2003 | Wada et al. | |
| 2003/0084019 A1 | 5/2003 | Woodmansee | |
| 2003/0149548 A1 | 8/2003 | Mosses et al. | |
| 2004/0117051 A1 | 6/2004 | Ford | |
| 2004/0123179 A1 | 6/2004 | Dragomir-Daescu et al. | |
| 2004/0172573 A1 | 9/2004 | Babu et al. | |
| 2005/0102571 A1 | 5/2005 | Peng et al. | |
| 2005/0171732 A1 | 8/2005 | Williams et al. | |
| 2007/0010923 A1 | 1/2007 | Rouyre | |
| 2007/0112486 A1 | 5/2007 | Avery et al. | |
| 2007/0192078 A1 | 8/2007 | Nasle et al. | |
| 2007/0214159 A1 | 9/2007 | Lawson et al. | |
| 2008/0021604 A1* | 1/2008 | Bouvier et al. | 701/30 |
| 2008/0059340 A1 | 3/2008 | McCaherty et al. | |
| 2008/0103788 A1 | 5/2008 | Morris et al. | |
| 2008/0249828 A1 | 10/2008 | MacAuley et al. | |
| 2009/0222427 A1 | 9/2009 | Malkowicz et al. | |
| 2009/0234616 A1 | 9/2009 | Perkins | |
| 2009/0271235 A1* | 10/2009 | Kubota | 705/7 |
| 2009/0281867 A1* | 11/2009 | Sievenpiper et al. | 705/10 |
| 2009/0312897 A1 | 12/2009 | Jamrosz et al. | |
| 2010/0121520 A1 | 5/2010 | Yukawa et al. | |
| 2010/0153448 A1 | 6/2010 | Harpur et al. | |

OTHER PUBLICATIONS

Weibull.com (Appendix A: Parameter Estimation) retreived from http://web.archive.org.*

David W Coit, & Alice E Smith. (2002). Genetic algorithm to maximize a lower-bound for system time-to-failure with uncertain component Weibull parameters. Computers & Industrial Engineering, 41(4), 423-440.*

Arizono, I., Kawamura, Y., & Takemoto, Y.. (2008). Reliability tests for Weibull distribution with variational shape parameter based on sudden death lifetime data. European Journal of Operational Research, 189(2), 570.*

Paul Barringer. (2007) Life Cycle Costs and Weibull Go Together Like PB&J (PowerPoint).*

EP Search Report dated Aug. 1, 2010, 09173186.9-2221 citing notice of the President in 0J2007/11, the content of the search opinion.

Kuzia E. Jr., et al.; Proactive Reliability Tracking, a Progress Report, Honeywell International & MIS Dept. University of Arizona.

Focusing on Safety, Reliability, Maintenance, and Cost Effectiveness in Today's Environment, The Civil Aviation Safety Symposium, Sep. 7-9, 2004, Dallas, Texas.

Kuzia E. Jr.; Civil Aviation Safety Symposium Proactive Reliability Tracking, Sep. 2004, pp. 1-27.

European Patent Office "Supplementary European Search Report," dated Sep. 6, 2010; Application No. 10165025.7-1238, filed Jun. 4, 2010.

European Patent Office "Statement in Accordance with the Notice from the European Patent Office dated Oct. 1, 2007, Concerning Business Methods—EPC / Erklaerung Gemaess Der Mitteilung Des Europaeischen Patentamts Vom Oct. 1, 2007 Ueber eschaeftsmethoden—EPU / Declaration Conformement Au Communique De L'Office Europ"; Nov. 1, 2007, XP007905525.

USPTO Office Action dated Jan. 24, 2011 for U.S. Appl. No. 12/254,668.

European Patent Office "EP Search Report," dated Apr. 16, 2010; Application No. 10151850.4-1238, filed Jan. 27, 2010.

Irene Eusgeld et al. "Hardware Reliability," Oct. 5, 2005, Dependability Metrics; [Lecture Notes in Computer Science], Springer Berlin Heidelberg, Berlin, Heidelberg, pp. 59-103, XP019076322; ISBN: 9783540689461.

USPTO Office Action for U.S. Appl. No. 12/483,081 with a Notification date of Jun. 7, 2011.

USPTO Office Action for U.S. Appl. No. 12/483,081; Notification Date Oct. 14, 2011.

USPTO Office Action for U.S. Appl. No. 12/254,668 with a Notification date of Aug. 5, 2011.

* cited by examiner

SYSTEM AND METHOD FOR PRODUCT DEPLOYMENT AND IN-SERVICE PRODUCT RISK SIMULATION

TECHNICAL FIELD

The present invention generally relates to product reliability risk forecasting and, more particularly to system and method for product deployment and in-service product risk simulation.

BACKGROUND

Reliability engineering in the aerospace industry involves simulating a deployment or release of one or more products into the marketplace in order to forecast the reliability and performance of those products. Such forecasts may be utilized to determine costs and financial risks associated with product reliability guarantees, determine appropriate pricing for a product, and/or for inventory and logistics management. For example, many maintenance service agreements require a producer of a product to meet certain reliability commitments for a predetermined amount of time. Poor performance over this period may result in financial penalties being levied against the producer. Reliability engineering enables the producer to identify the risks of a deploying a product up front so that such costs and financial penalties can be avoided.

Currently, many reliability engineering tools simulate a product deployment based on a Monte Carlo simulation methodology that predicts the cumulative reliability for a population of deployed products based on the historical reliability of similar products. Other reliability engineering tools are based on probabilistic methods that use a probability density function to characterize product failures by estimating the cumulative risk of failure for the population of deployed products. Each of these methods predicts the cumulative reliability of a population of deployed products, they may prevent reliability engineers from accurately assessing the risk associated with a product deployment. For example, some product populations may have statistical distributions that allow the cumulative reliability measure to exceed a predetermined reliability target, even though a significant number of products within the population do not meet the reliability target. Thus, in order to accurately assess the risks of a product deployment it is necessary to predict product reliability for each deployed product population.

Accordingly, it is desirable to provide a method for predicting the reliability of each product for a product deployment. In addition, it is desirable to provide a method for assessing the risk associated with the product deployment. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, and by way of example only, a method is provided for predicting the reliability of a plurality of products that will be deployed during a product deployment period comprising a plurality of time intervals. The method comprises retrieving historical product removal data from a product removal data source, retrieving historical product shipment data from a product shipment data source, identifying a plurality of Weibull parameters based on at least a portion of retrieved product removal data and product shipment data, and performing a plurality of product deployment simulations, wherein each product deployment simulation includes predicting a lifespan for each of the plurality of products and determining reliability metrics for at least a portion of the plurality of time intervals of the product deployment period.

In another exemplary embodiment, a product deployment simulation and tracking system is presented for predicting the reliability of a plurality of products that will be deployed during a product deployment period. The product deployment simulation and tracking system comprises a product removal data source comprising historical product removal data and a processor coupled to the product removal data source. The processor is configured to retrieve the historical product removal data from the product removal data source, identify a shape parameter and a scale parameter that describe a Weibull distribution for at least a portion of the retrieved product removal data, perform a plurality of product deployment simulations, wherein each product deployment simulation includes predicting a lifespan for each of the plurality of products and utilizing an MTBX algorithm to determine reliability metrics for uniform time intervals during the product deployment period, and generate at least one MTBX Chart based on the reliability metrics.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
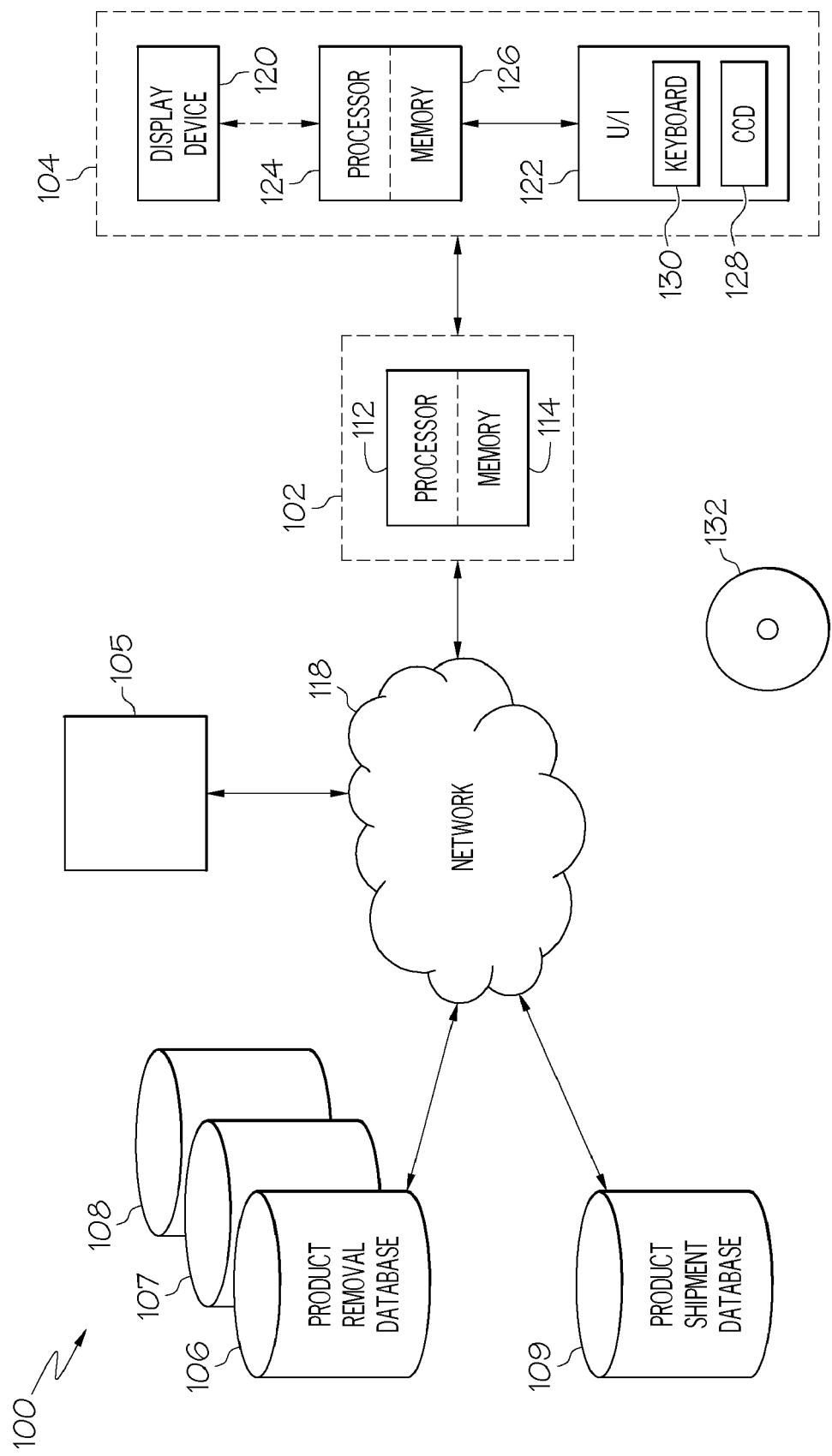
FIG. 1 is a functional block diagram of a system that may be used to implement embodiments of the present invention.

A product deployment and in-service product risk simulation system 100 that may be used to implement the methodologies described herein is depicted in FIG. 1, and includes at least one server computer 102, a plurality of user computers 104, 105, one or more product removal databases 106, 107, 108, and a product shipment database 109. In the depicted embodiment, only a single server computer 102 is depicted. The server computer 102 includes a processor 112 and memory 114. Processor 112 may include one or more microprocessors, each of which may be any one of numerous known general-purpose microprocessors or application specific processors that operate in response to program instructions. The memory 114 may include electronic memory (e.g., ROM, RAM, or another form of electronic memory) configured to store instructions and/or data in any format, including source or object code. As depicted, system 100 includes only one server computer 102. It will be appreciated that this is done merely for clarity, and that the system 100 could be implemented with a plurality of server computers 102. It will additionally be appreciated that if the system 100 is implemented with a plurality of server computers 102, each of the server computers 102 could be collocated, or one or more of the server computers 102 could be remotely located from each other. In any case, each server computer 102 has software loaded thereon (e.g., in memory 114), or is accessible to software loaded in non-illustrated external memory, that implements at least a portion of the product deployment simulation methodology described further below and that allows each, or at least selected ones, of the user computers 104, 105 to interact with the software to implement at least a portion of this methodology.

The user computers 104, 105 are in operable communication with the server computer 102 either via a non-illustrated local area network or a wide area distributed network 118, such as a secure intranet, the Internet, or the World Wide Web. In either case, the user computers 104, 105 are also in operable communication with the product removal databases 106-108 and product shipment database 109, either via the server computer 102 and local area network or via the distributed network 118.

Before proceeding further, it is noted that the software that is used to implement the methodology that will be described further below could be installed on individual ones of the user computers 104, if needed or desired. In this regard, it will be appreciated that the system 100 could be implemented without the server computer(s) 102, or that one or more of the user computers 104, 105 could implement the methodology without having to access software on a server computer 102. In any case, for completeness of description, a brief discussion of an exemplary device that may be used to implement a user computer 104 will now be provided.

In the depicted embodiment, each of the user computers 104, 105 includes a display device 120, a user interface 122, a processor 124, and electronic memory 126. The display device 120 is in operable communication with the processor 124 and, in response to display commands received therefrom, displays various images. It will be appreciated that the display device 120 may be any one of numerous known displays suitable for rendering graphic, icon, and/or textual images in a format viewable by a user. Non-limiting examples of such displays include various cathode ray tube (CRT) displays, and various flat panel displays such as, for example, various types of LCD (liquid crystal display) and TFT (thin film transistor) displays. The display device 120 may additionally be based on a panel mounted display, a head up display (HUD) projection, or any known technology.

The user interface 122 is in operable communication with the processor 124 and is configured to receive input from a user and, in response to the user input, supply various signals to the processor 124. The user interface 122 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 122 includes a CCD 128 and a keyboard 130. A user may use the CCD 128 to, among other things, move a cursor symbol over, and select, various items rendered on the display device 120, and may use the keyboard 130 to, among other things, input various data. A more detailed description of the why a user may select various rendered items with the CCD 128, and the various data that a user may input is provided further below.

The processor 124 is in operable communication with the display device 120 and the user interface 122 via one or more non-illustrated cables and/or busses, and is in operable communication with the server computer 102 via the local area network or the distributed network 118. The processor 124 is configured to be responsive to user input supplied to the user interface 122 to, among other things, selectively interact with the server computer 102, and to command the display device 120 to render various graphical user interface tools, associate data that are input via the user interface 122 with component parts that are also input or selected via the user interface 122.

The processor 124 may include one or more microprocessors, each of which may be any one of numerous known general-purpose microprocessors or application specific processors that operate in response to program instructions. The electronic memory 126 may comprise any form of electronic memory (e.g., ROM, RAM, or another form of electronic memory) configured to store instructions and/or data in any format, including source or object code. The program instructions that control the processor 124 may be stored on the electronic memory 126, or on a non-illustrated local hard drive. It will be appreciated that this is merely exemplary of one scheme for storing operating system software and software routines, and that various other storage schemes may be implemented. It will also be appreciated that the processor 124 may be implemented using various other circuits, not just one or more programmable processors. For example, digital logic circuits and analog signal processing circuits could also be used.

The product removal databases 106-108 preferably have various product removal data stored therein that are associated with a plurality of products. It will be appreciated that, although the product removal databases 106-108 are, for clarity and convenience, shown as being stored separate from the server computer 102, all or portions of these databases 106-108 could be loaded onto the server computer 102. Moreover, the product removal databases 106-108, or the data forming portions thereof, could also be part of one or more non-illustrated devices or systems that are physically separate from the depicted system 100. It will additionally be appreciated that the amount and type of data that comprise the product removal databases 106-108 may vary. Preferably, the product removal databases 106-108 are configured to include a plurality of data fields associated with each product, which may include customer-supplied data fields. Some non-limiting examples of such data fields include a part number field, a part description field, a part serial number field, a repair facility name field, a component owner/operator name field, a removal date field, a reason for removal field, an evaluation result description field, a return type description field, time since new, installation dates, and an analyst comments field, just to name a few.

The product shipment database 109 preferably has various product shipment data associated with a plurality of products stored thereon. It will be appreciated that, although the product removal database is, for clarity and convenience, shown as being stored separate from the server computer 102, all or portions of this database 109 could be loaded onto the server computer 102. Moreover, the product shipment database, or data forming portions thereof, could also be part of one or more non-illustrated devices or systems that are physically separate from the depicted system 100. It will additionally be appreciated that the amount and type of data that comprise the product shipment database 109. Preferably, the product shipment database 109 is configured to include a plurality of data fields associated with each product. Some non-limiting examples of such data fields include a part number field, a part description field, a part serial number field, and a shipment or release date field.

Figure 2:
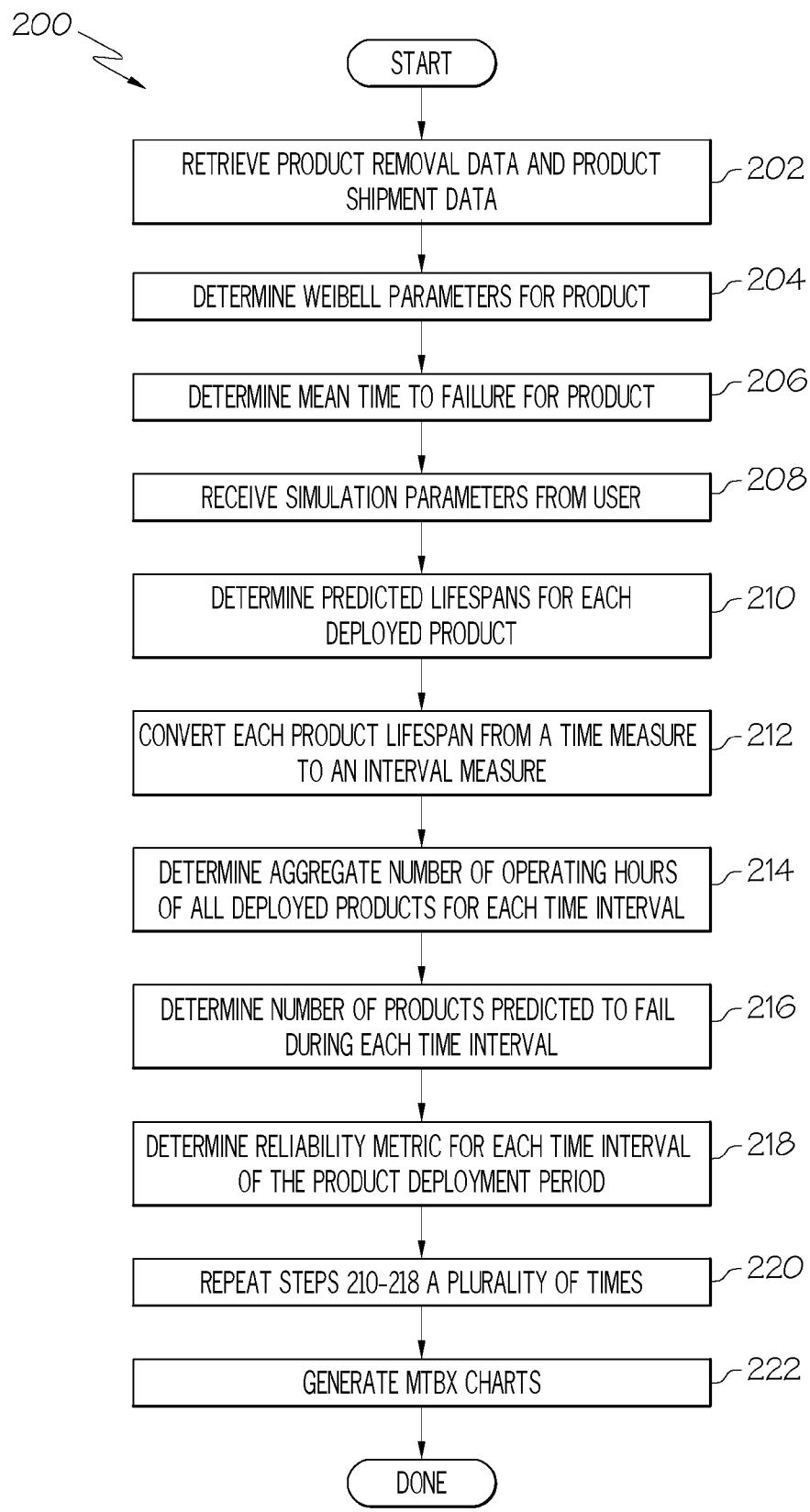
FIG. 2 depicts an exemplary process, in flowchart form, that may be implemented by the exemplary system of FIG. 1.

The system 100 described above and depicted in FIG. 1 implements a method for simulating, and assessing risks associated with, a potential product deployment. The overall method 200 by which the system 100 implements this methodology is depicted in flowchart form in FIG. 2, and with reference thereto will now be described in more detail. Before doing so, however, it is noted that the depicted method 200 is merely exemplary of any one of numerous ways of depicting and implementing the overall process to be described. Moreover, the method 200 that is implemented by the system 100 may be a software driven process that is stored, in whole or in part, on one or more computer-readable media, such as the media 132 depicted in FIG. 1. It will additionally be appreciated that the software may be stored, in whole or in part, in one or more non-illustrated memory devices and/or the server computer 102 and/or one or more of the user computers 104, 105.

The server computer 102 (and/or one or more user computers 104, 105), upon initiating method 200, retrieves historical product removal data from the product removal databases 106-108 and the historical product shipment data from the product shipment database 109 (step 202). The retrieved product removal data and product shipment data covers a predetermined Weibull Analysis Period that, preferably, is a time period when the product removal data and the product shipment data are complete enough to enable the server computers 102 (and/or one or more user computers 104, 105) to perform the Weibull analysis described below.

As described above, the product removal data includes a product removal data field identifying the time when each product was removed from an aircraft and a reason for removal data field identifying the reason the product was removed. This product removal data enables the server computer 102 (and/or one or more user computers 104, 105) to determine the number of unscheduled product removals that occur during each time interval (e.g., month) of the Weibull Analysis Period and that are attributable to one or more failure events (e.g., hereinafter the "Relevant Failure Event(s)"). The Relevant Failure Event(s) may comprise every possible failure mode for the product or one or more failure modes that are selected by the user.

Further, the product shipment data includes a product shipment field identifying the time when a product was shipped or released and, presumably, installed on an aircraft. This information enables the server computer 102 (and/or one or more user computers 104, 105) to determine a suspension time for each product that does not experience a Relevant Failure Event(s) during the Weibull Analysis Period. The suspension time simply represents that amount of time that suspended product has been operating without a failure or removal event.

Next, the server computer 102 (and/or one or more user computers 104, 105) determines the values of a plurality of Weibull parameters for the product of interest and the Relevant Failure Event(s) based on the accessed product removal data (e.g., the unscheduled removal/failure time for each product that experiences one of the Relevant Failure Event(s)) and the accessed product shipment data (e.g., the suspension time for each product that does not experience one of the Relevant Failure Event(s)) for the Weibull Analysis Period (step 204). The Weibull parameters are derived from Weibull analysis performed on a Weibull distribution generated based on the accessed data. The Weibull parameters may be derived or they may be retrieved from an existing library of derived parameters. In one embodiment, the Weibull parameters comprise a shape parameter beta ($\beta$) and a scale parameter Eta ($\eta$) for the Weibull distribution described by the accessed data. However, it will be understood by one who is skilled in the art that other numbers (e.g., three) and types of Weibull Parameters may be determined during step 204.

After determining the values for the Weibull parameters, the server computer 102 (and/or one or more user computers 104, 105) determines a Mean Time to Failure (MTTF) for the product (step 206). The MTTF represents the average time between failures in a system and is determined based on $\beta$ and $\eta$. In one embodiment, the MTTF is determined by according to Equation 1 below:

$$MTTF = \eta * \Gamma(1/\beta + 1) \quad \text{(Eq. 1)}$$

where $\Gamma$ is the Gamma Function.

Next, the server computer 102 (or one or more user computers 104, 105) receives simulation parameters from a user (step 208). These simulation parameters are used to perform the product deployment and performance simulations described below. The simulation parameters include: a product deployment data source, a product utilization rate, a base algorithm, an analysis interval, and a reliability target. In one embodiment, a user of system 100 identifies these parameters via a graphical user interface displayed on a display device (e.g., display device 120 of FIG. 1).

The product deployment data source may be any data source, such as a file stored on a computer readable media, such as media 132, comprising product deployment data. The product deployment data describes a potential deployment of a product and identifies the number of products to be deployed during each time interval of a product deployment period. For example, in the embodiments described below the product deployment data will include the number of products shipped or released during each month of the deployment period. However, it will be understood by one who is skilled in the art that other time intervals (e.g., days, weeks, years) may also be used.

The product utilization rate identifies the rate at which the product is expected to be used during the deployment period. For example, in one embodiment the utilization rate identifies the number of hours of operation per month for the aircraft on which the product is expected to be utilized. The utilization rate may be retrieved from the generally well-known ACAS (AirCraft and fleet Analytical System) database or from a separate aircraft flight-hours database.

The base algorithm identifies the algorithm that will be utilized to determine reliability metrics for the time intervals (e.g., months) of the product deployment period during the simulations. Various base algorithms may be included for selection by the user. In one embodiment, the base algorithm may be one of the various mean-time between failure (e.g., MTBX and/or iMTBX) algorithms. Specific embodiments of each algorithm are described below in more detail.

The analysis interval identifies a specific interval over which the reliability metric for each time interval of the deployment period will be determined. As will be further described below, when the selected base algorithm is MTBX the analysis interval may either be "Cumulative" in which each reliability measure is determined based on the current and all previous time intervals or a "Months Moving Average" in which each reliability measure is determined based on time intervals that are within a moving window having a selected length (e.g., 3, 6, or 12 months).

The reliability target is a desired target value for the reliability metrics that are determined during the simulations described below. For example, the reliability target may be a desired MTBX or iMTBX value for each time interval (e.g., month) of the product deployment period. The reliability target value may be chosen by a reliability engineer, or other personnel. It may be determined based on industry standards, a guarantee or warranty made by the producer of the product, or any other method for determining a desired reliability measure for a proposed product deployment.

It should be noted that, in addition to the simulation parameters described above, other simulation parameters may also be received during step 208. For example, the user may provide a desired end date for the product deployment analysis. The desired end date may be any date that is covered by the product deployment data. In addition, the user may specify whether the simulation results should be reported in percentage or percentile form as further described below.

During steps 210-218 of method 200, the server computer 102 (and/or one or more user computers 104, 105), simulates the product deployment described by the product deployment data. As further described below, each simulation predicts an individual failure time for each product described by the deployment data based on the Weibull parameters described above. Thus, each simulation represents a possible realization of the real world deployment in which the products are shipped or released by the producer and fail at times that are statistically consistent with historical failure rates for the product. Reliability metrics (e.g., MTBX or iMTBX values) are then determined for each time interval of the product deployment period based on the product deployment data and the predicted failure times. These reliability measures may be used to assess the risk of a product deployment as discussed below.

During step 210, the server computer 102 (and/or one or more user computers 104, 105) determines a predicted lifespan for each deployed product. The predicted lifespan represents the predicted duration of time (e.g., in hours) between shipment of release of the product and the time when the product experiences a Relevant Failure Event and should be removed from the aircraft. The predicted product lifespans are determined based on the Weibull distribution described by the Weibull parameters determined during step 204. In one embodiment, the product life spans are determined utilizing a Cumulative Distribution Function for the Weibull distribution as expressed by the following equation:

$$F(T)=1-e^{-(t/\eta)^{\beta}} \quad \text{(Eq. 2)}$$

where:

F(T) is a random function and is generated based on the uniform distribution from 0 to 1; and t is the predicted product lifespan.

Rearranging Equation 2 and applying the natural logarithm to both sides produces the following equation:

$$LN[1-F(T)]=(t/\eta)^{\beta} \quad \text{(Eq. 3)}$$

Solving Equation 3 for t yields the following:

$$t=\eta*\{LN[1-F(T)]\}^{\wedge}(1/\beta) \quad \text{(Eq. 4)}$$

During step 210, server computer 102 (and/or one or more user computers 104, 105) utilize Equation 4 to determine a product life span (t) for each deployed product described in the product deployment data.

Next, the server computer 102 (and/or one or more user computers 104, 105) converts each product life span from a time measure (e.g., a number of hours/cycles) into a time interval measure (e.g., a number of months) based on the product utilization rate (step 212). For example, where the product life spans determined during step 210 are measured in hours and the utilization rate is in hours per month, step 212 may be performed by dividing each product life span by the utilization rate. Step 212 enables the server computer 102 (and/or one or more user computers 104, 105) to identify the time interval when each deployed product is predicted to fail by adding the number of time intervals determined during step 212 to the time interval when the product is shipped or released according to the product deployment data.

During step 214, the server computer 102 (and/or one or more user computers 104, 105) determines an aggregate number of operating hours of all deployed product for each time interval of the product deployment period. Step 214 may be performed by determining the number of products in operation during the time period (e.g., the number of products that have been deployed and have not yet been removed on or before the time interval) multiplied by the utilization rate. In addition, the server computer 102 (and/or one or more user computers 104, 105) determines the number of deployed products predicted to experience one or more Relevant Failure Event(s) during each time interval of the product deployment period (step 216).

Next, the server computer 102 (and/or one or more user computers 104, 105) determines a reliability metric for each time interval of the product deployment period (step 218). The reliability metrics are determined by executing the identified base algorithm (e.g., MTBX or iMTBX) and variant. In one embodiment, a user of system 100 selects a base algorithm and variant via a graphical user interface displayed on a display device (e.g., display device 120 of FIG. 1). Specific embodiments of each algorithm and variant are described below.

The iMTBX algorithm (e.g., the instaneous MTBX), when selected, determines the average time-between-failure (e.g., the average mean time between the occurrence of one or more Relevant Failure Event(s)) for a given time interval of the deployment period. One method for determining the instantaneous MTBX is to divide the aggregate number of operating hours for the time interval (e.g., month) in question by the number of Relevant Failure Events occurring during that time interval (as determined during step 214). For example, if 4 Relevant Failure Events occur in a first interval of 0-100 hours, the instantaneous MTBX is equal to 25 hours (e.g., 100/4). However, if 2 Relevant Failure Events occur in a second interval of 100-200 hours, then the instantaneous MTBX is equal to 50 hours (e.g., 100/2).

In addition, the instantaneous MTBX may be determined utilizing a Crow-AMSAA model to determine the reciprocal of a model intensity function, as described below. The Crow-AMSAA model is a statistical model that may be used to model the occurrence of failures of components in mechanical systems, such as aerospace components. If the Crow-AMSAA model applies, as represented by Equation 5 below, then the log of cumulative Relevant Failure Events n(t) versus log cumulative time (t) is linear:

$$n(t)=\lambda t^{\sigma} \quad \text{(Eq. 5)}.$$

In Equation 5, σ determines the "growth rate" of failures. It is sometimes referred to as the "shape" parameter for the Crow-AMSAA model, due to its influence on the basic shape of the graph of Equation 5. If σ is relatively large, it indicates that the cumulative number of Relevant Failure Events is increasing disproportionately with time, which may signal a potential problem. λ determines the magnitude of the Relevant Failure Events, and is often referred to as the "scale" parameter for the Crow-AMSAA model. It should be noted that the shape and scale parameters (e.g., σ, λ) for the Crow-AMSAA model are separate from the shape and scale parameters (e.g., β, η) described above with respect to step 204.

The skilled artisan will appreciate that taking the natural log of both sides of Equation (5) yields Equation (6):

$$\ln n(t)=\ln \lambda+\sigma \ln t \quad \text{(Eq. 6)}.$$

The skilled artisan will additionally appreciate that Equation (6) is a straight-line function, if it is plotted on a log scale, and that the scale parameter (λ) is the y-intercept when t=1 unit, and the shape parameter (σ) is the slope.

Another parameter associated with the Crow-AMSAA model is what is known as "the model intensity function." The model intensity function (ρ(t)), as shown below in Equation (7), is the first derivative of Equation (5), and measures the instantaneous failure rate at each cumulative test time point:

$$\rho(t) = \frac{dn(t)}{dt} = \frac{d(\lambda t^\sigma)}{dt} \quad \text{(Eq. 7)}$$
$$p(t) = \lambda \sigma t^{\sigma-1}.$$

The reciprocal of the model intensity function (e.g., $1/\rho(t)$) is the instantaneous MTBX. Thus, the instantaneous MTBX (iMTBX) may be represented as shown below by Equation (8):

$$iMTBX = 1/(\lambda \sigma t^{\sigma-1}) \quad \text{(Eq. 8).}$$

As alluded to above, the Crow-AMSAA λ value is the y-intercept of Equation (6), and can be estimated from the value of n(t) at t=1 unit. Moreover, the σ value can be estimated by calculating the slope (e.g., the rise over run) of the line. Various methods of estimating the λ and σ values are available. Two of the available methods are a linear regression method and a Maximum Likelihood Estimation (MLE) method. To implement the linear regression method, the data are first plotted on the logarithmic scale, with cumulative events on the y-axis and cumulative time on the x-axis. Then, using well-known linear regression analysis, a best-fit line is used to represent the data. The MLE method is generally used with interval or grouped data, in which the σ value is estimated by finding a σ value that satisfies Equation (9) below:

$$\sum_{i=1}^{k} N_i \left[ \frac{t_i^\sigma \ln t_i - t_{i-1}^\sigma \ln t_{i-1}}{t_i^\sigma - t_{i-1}^\sigma} - \ln t_k \right] = 0 \quad \text{(Eq. 9)}$$

where, $t_i$=time at the $i^{th}$ interval, and $t_k$=total time (last interval time). The solution for σ can be obtained using the well-known Newton-Raphson method, which is an iterative process to approach a root of a function. The specific root that the process locates will depend on the initial, arbitrarily chosen x-value. In any case, the λ value may then be estimated from Equation (10) below.

$$\lambda = \frac{\sum_{i=1}^{k} N_i}{t_k^\sigma}. \quad \text{(Eq. 10)}$$

The Months Moving Average variant of the MTBX algorithm calculates the MTBX over a specified number of time intervals (e.g., a specific time window). For example, the time window may comprise a 3, 6, 9, or 12 month time period surrounding the time interval in question. For this variant, the MTBX is preferably calculated as the total number of flight hours for each month of the window divided by the total number of Relevant Failure Events for each month of the window.

The Cumulative Trend MTBX variant calculates the MTBX between the beginning of the product deployment period and the time interval in question. For this variant, the MTBX is preferably calculated as the cumulative number of operating hours for each time interval from the start of the deployment period divided by the cumulative number of Relevant Failure Events since the start of the deployment period.

Steps 210-218 each comprise one simulation of a product deployment and may be repeated a plurality of times (step 220). The number of simulation iterations may be selected by the user or it may be predetermined. During each simulation, a new set of reliability metrics for each time interval of the product deployment period are identified during step 218. These reliability metrics may be stored by the server computer 102 (and/or one or more user computers 104, 105) in memory.

Finally, during step 222 the server computer 102 (and/or one or more user computers 104, 105) generates MTBX Charts for determining the risk associated with the product deployment described by the product deployment data. When the selected reliability target that was received from the user during step 208 is less than the MTTF that is generated during step 206, the MTBX Charts are utilized to determine a producer's risk of deployment. In this case, the computed Mean Time to Failure (e.g., the average amount of time between the shipment/release of the product and one or more Relevant Failure Events based on historical data) statistically exceeds the reliability metric (e.g., MTBX or iMTBX). When the computed MTTF exceeds the reliability metric the product we will say that the product is a "good" product. The producer's risk identifies the probability that a "good" product which statistically exceeds the reliability target based on historical data, will fail to meet the reliability target.

Figure 3A:
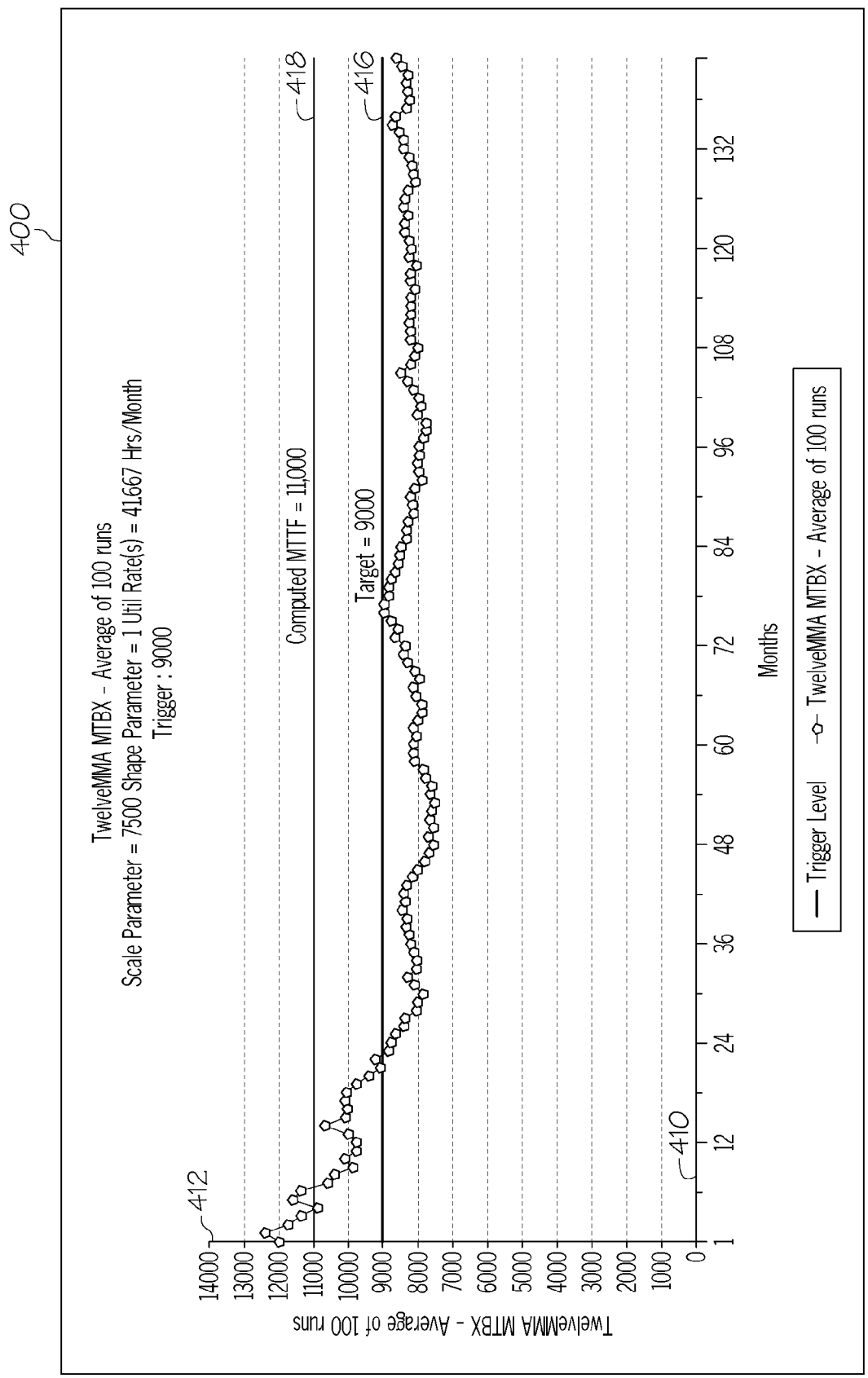
FIG. 3A depicts an exemplary average MTBX Chart suitable for determining a producer's risk of deployment.

FIG. 3A depicts an exemplary average MTBX Chart 400 generated during step 222 (FIG. 2) of method 200. Chart 400 identifies, for each time interval of the deployment period, the average reliability metric value generated during each iteration of step 218 (FIG. 2) of method 200. The x-axis 410 represents the successive time intervals (e.g., months) of the product deployment time period and the y-axis 412 represents the reliability metric values. In the depicted embodiment, chart 400 represents the results of a product deployment simulation based on a Twelve-Month Moving Average MTBX algorithm having a scale parameter equal (η) of 7,500, a shape parameter (β) of 1, a utilization rate of 41.667 hours/month, a reliability trigger of 9,000, and a computed MTTF of 11,000. The reliability metric target and the computed MTTF are depicted as lines 416 and 418, respectively. Chart 400 describes a "good" product because the computed MTTF 418 exceeds the reliability target metric 416. Thus, chart 400 (and the percentage MTBX Chart 500 described below with reference to FIG. 3B) may be used to assess the producer's risk of deployment or the risk to the producer that a product that is statistically reliable will not meet the reliability target metric for a given time interval.

It should be noted that the information in Chart 400 may also be represented in percentile form. For example, during step 208 (FIG. 2) of method 200 the user may select or identify a percentile value (e.g., $25^{th}$ percentile, $50^{th}$ percentile, $75^{th}$ percentile). In this case, the y-axis 412 would represent the reliability metric values (e.g., MTBX values) and chart 400 plots the value of the selected percentile of reliability metric values determined during step 218 (FIG. 2) for each time interval. For example, if the user selected the $75^{th}$ percentile during step 208 (FIG. 2) chart 400 would plot, for each time interval, the reliability metric value at the 75 percentile.

Figure 3B:
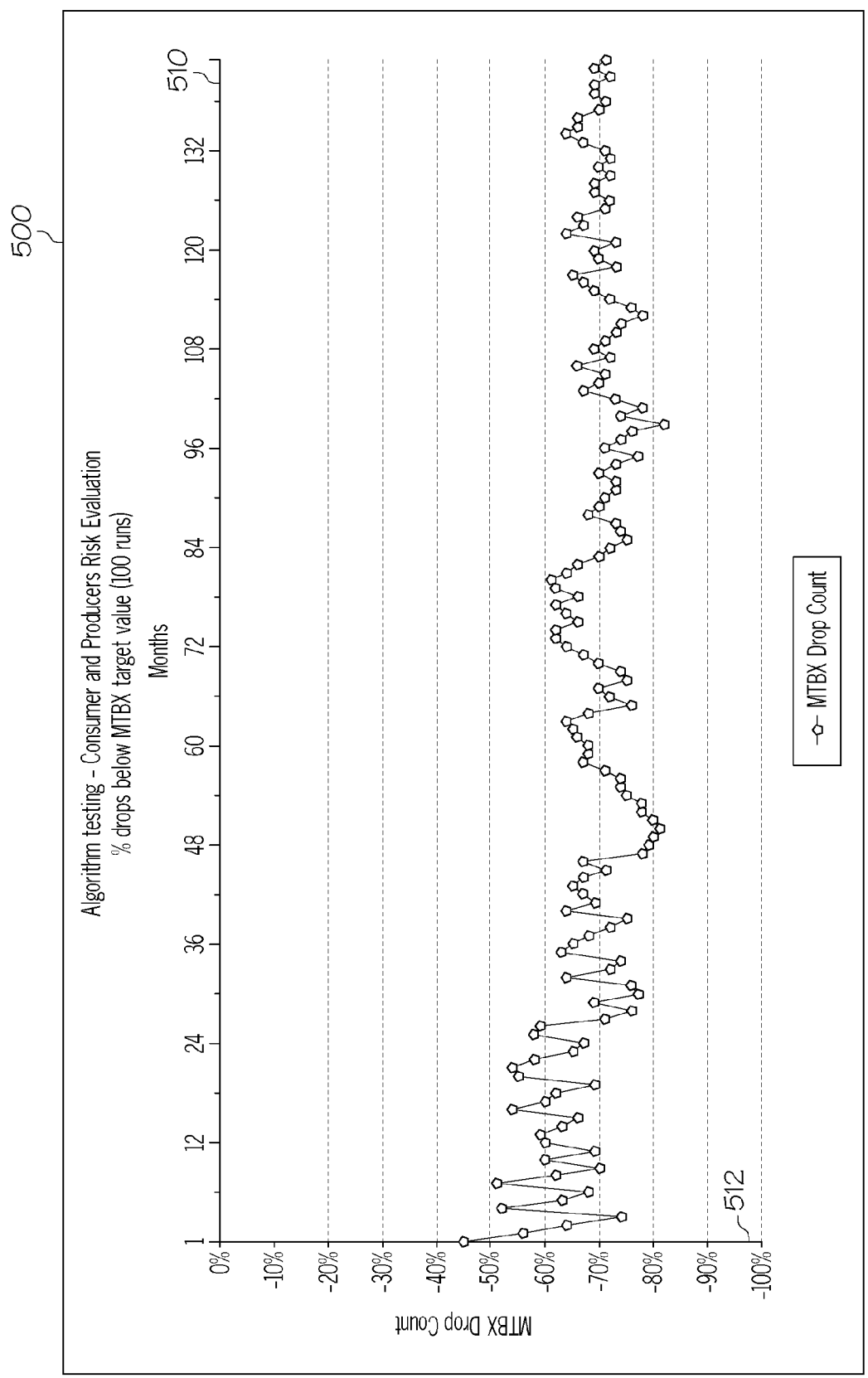
FIG. 3B depicts an exemplary percentage MTBX Chart suitable for determining a producer's risk of deployment.

FIG. 3B depicts an exemplary percentage MTBX Chart 500 that may be generated during step 222. Chart 500 depicts the percentage of simulation iterations for which the reliability metric generated during step 218 (FIG. 2) of method 200 did not meet the reliability target metric. The x-axis 510 represents the successive time intervals of the product deployment period and the y-axis 512 represents the percentage of simulation iterations for which the generated reliability metric was below the reliability target (e.g., 9,000). A product reliability engineer may analyze chart 500 to determine how often the simulated product deployments did not meet the reliability target. For example, as depicted, approximately 60% of the simulation iterations for Month 12 did not meet the reliability trigger. Thus, the simulation predicts in 600 out of 1000 simulation trials, the MTBX for Month 12 does not meet the reliability target metric, even though the computed MTTF value for the product exceeds the reliability target. The simulation engineer may use this information to assess the costs to the producer of guaranteeing different performance levels for the product. For example, the reliability engineer can use chart 500 to assess whether a product will fail to meet proposed performance guarantees of a negotiated contract, resulting in harsh financial consequences for the producer.

Alternatively, when the selected reliability target received from the user during step 208 (FIG. 2) is greater than the MTTF generated during step 206, the MTBX Charts are utilized to determine a consumer's risk of deployment. In this case the product statistically falls short of the reliability target because the computed Mean Time to Failure (e.g., the amount of time between the shipment and release of the product and one or more Relevant Failure Events based on historical data) is less than the reliability metric (e.g., MTBX or iMTBX). Where the computed MTTF is less than the reliability target we will say that the product is a "bad" product. The consumer's risk is the risk that a consumer will accept a "bad" product.

Figure 4A:
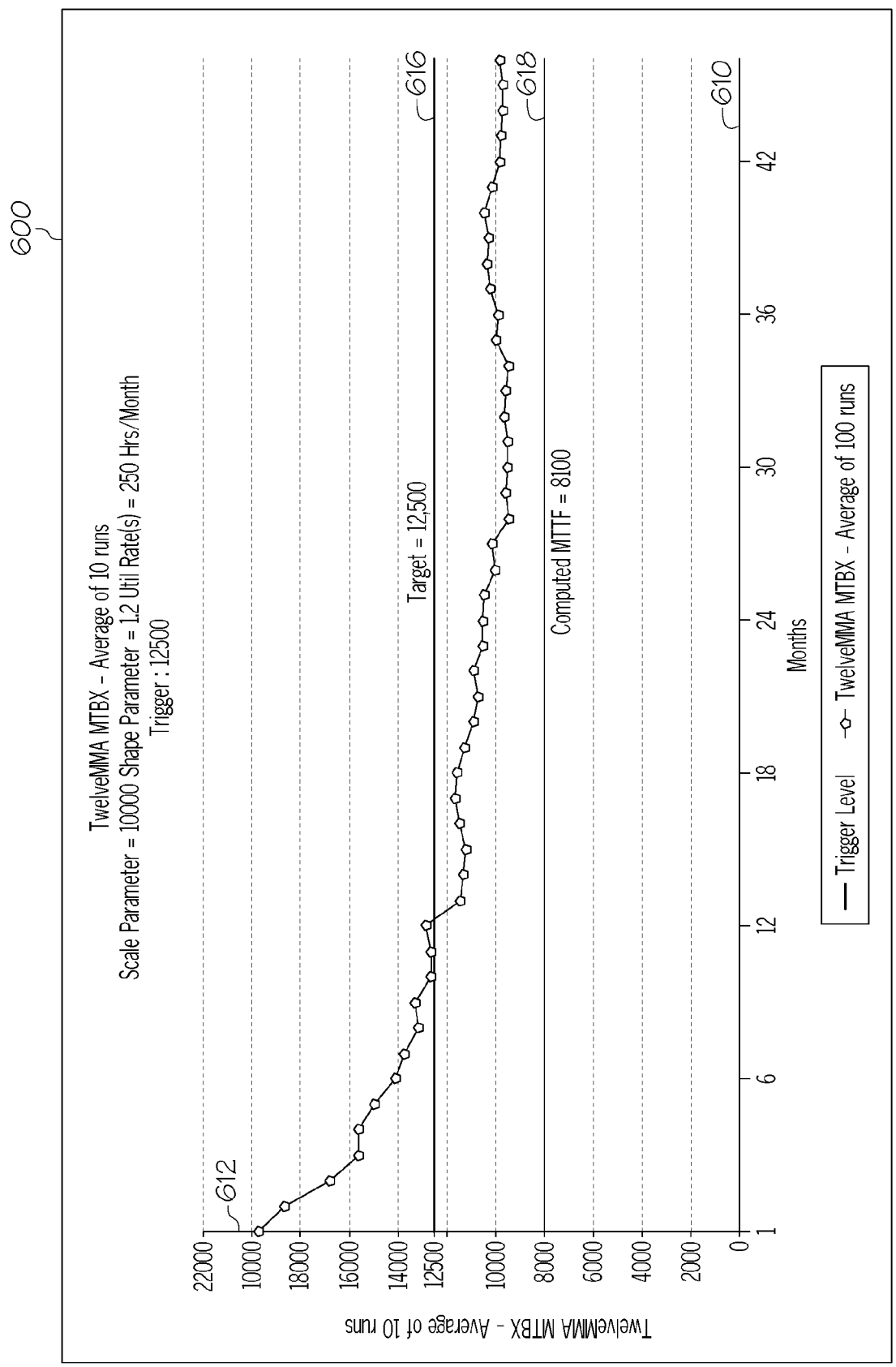
FIG. 4A depicts an exemplary average MTBX Chart suitable for determining a producer's risk of deployment.

FIG. 4A depicts an exemplary average MTBX Chart 600 that may be generated during step 222 (FIG. 2) of method 200. Chart 600 identifies, for each time interval of the deployment period, the average reliability metric value generated during each iteration of step 218 (FIG. 2) of method 200. The x-axis 610 represents the successive time intervals (e.g., months) of the product deployment time period and the y-axis 612 represents the reliability metric values. In the depicted embodiment, chart 600 represents the results of a product deployment simulation based on a Twelve-Month Moving Average MTBX algorithm having a scale parameter equal ($\eta$) of 10,000, a shape parameter ($\beta$) of 1.2, a utilization rate of 41.667 hours/month, a reliability trigger of 12,500, and a computed MTTF of 8100. The reliability target (e.g., MTBX value) and the computed MTTF are depicted as lines 616 and 618, respectively. As depicted, chart 600 describes a "bad" product because the computed MTTF 618 is less than the reliability target 616. Thus, charts 600 (and the percentage MTBX Chart 700 described below with reference to FIG. 4B) may be used to assess the consumer's risk of deployment or the risk to the consumer will accept a "bad" product.

It should be noted that the information in Chart 600 may also be represented in percentile form. In this case, the y-axis 612 would represent the reliability metric values (e.g., MTBX values) and chart 600 plots the value that is above the selected percentile for the reliability metric value determined during step 218.

Figure 4B:
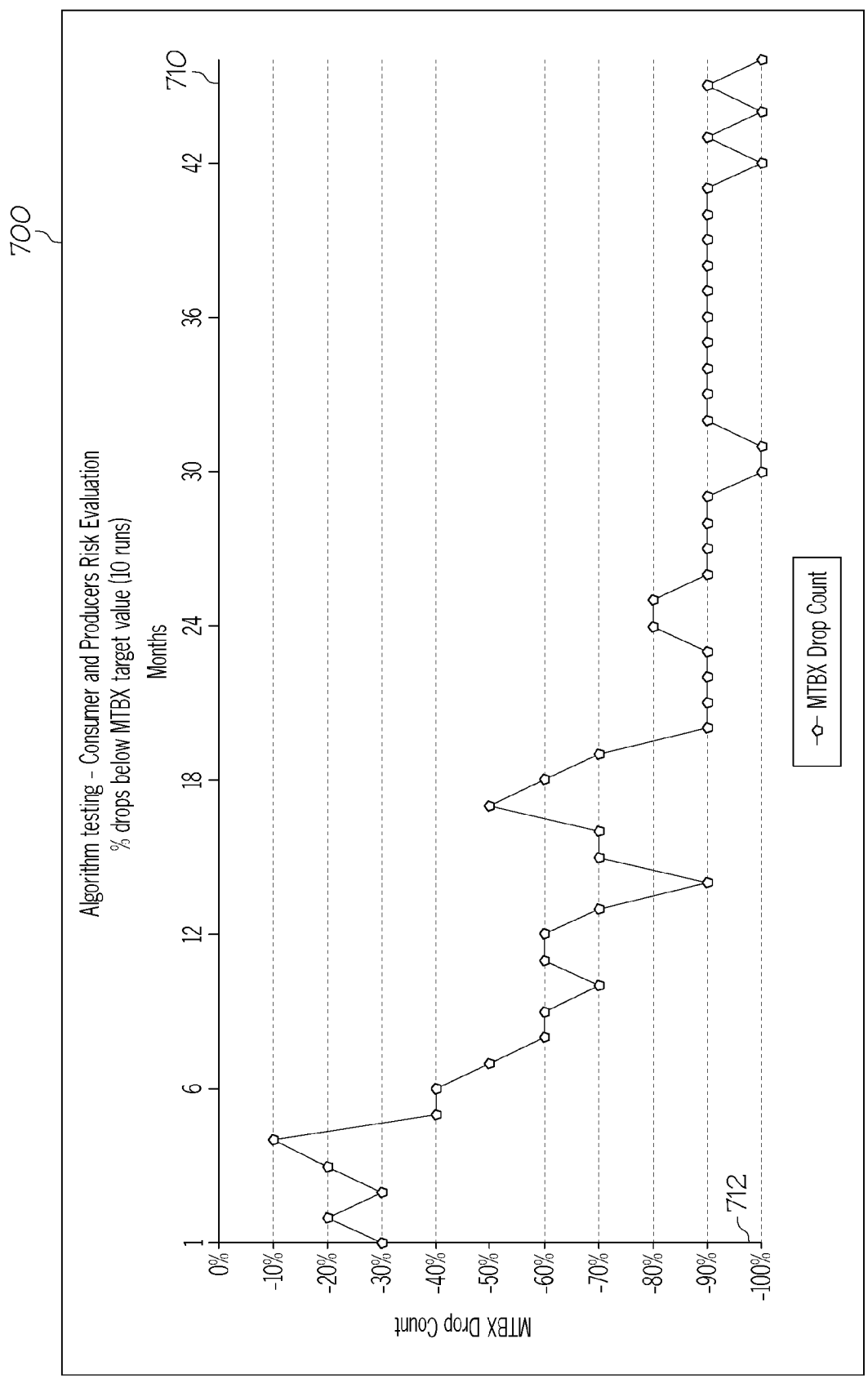
FIG. 4B depicts an exemplary percentage MTBX Chart suitable for determining a consumer's risk of deployment.

FIG. 4B depicts an exemplary percentage MTBX Chart 600 that may be during step 222 (FIG. 2) of method 200. Chart 700 depicts the percentage of simulation iterations for which the reliability metric generated during step 218 (FIG. 2) of method 200 did not meet the reliability target (e.g., were removed from the aircraft before the reliability target). The x-axis 710 represents the successive time intervals of the product deployment period and the y-axis 712 represents the percentage of simulation iterations for which the generated reliability metric was below the reliability target (e.g., 12,500). A product reliability engineer may analyze chart 700 to determine how often the simulated product deployments did not meet the reliability target. For example, as depicted, 40% of the simulation iterations for Month 6 did not meet the reliability trigger. This means that in 40% of the cases the value fell below the trigger level and indicates bad product. Therefore, during Month 6 there is a 60% (e.g., 100%-40%) chance that a customer will accept a "bad" product. This represents the Consumer's risk. Thus, the reliability engineer may utilize charts 400, 500, 600, and 700 to balance the producer's risk and consumer's risk to determine product performance guarantees that will reduce costs for both parties.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A product deployment and in-service product risk simulation system for predicting the reliability of a plurality of products that will be deployed during a product deployment period, the system comprising:
   a product removal data source comprising historical product removal data;
   a product shipment data source comprising historical product shipment data; and
   a processor coupled to the product removal data source and the product shipment data source, the processor configured to:
   retrieve historical product removal data from the product removal data source;
   retrieve historical product shipment data from the product shipment data source;
   identify a shape parameter and a scale parameter by performing a Weibull analysis on the retrieved historical product removal data and historical product shipment data; and
   perform a plurality of product deployment simulations:
      a) predicting a product lifespan for each of the plurality of products, each product lifespan comprising a random failure time that is selected based on values of the shape parameter and the scale parameter;
      b) determining a total number of operational hours for all deployed products for uniform time intervals of a product deployment period;
      c) determining a total number of product failures for the uniform time intervals of the product deployment period;
      d) utilizing a selected base algorithm to determine a product reliability metric for the uniform time intervals of the product deployment period based on the total number of operational hours and the total number of product failures; and
      e) repeating a) through d) a plurality of times.

2. The system of claim 1, wherein the processor is further configured to determine a Mean Time to Failure based on the shape parameter and the scale parameter.

3. The system of claim 2, wherein the selected base algorithm is a mean time between failure (MTBX) algorithm.

4. The system of claim 3, wherein the MTBX algorithm comprises an instantaneous MTBX (iMTBX) algorithm.

5. The system of claim 3, wherein the MTBX algorithm comprises a moving months variant of the MTBX algorithm.

6. The system of claim 3, wherein the MTBX algorithm comprises a cumulative variant of the MTBX algorithm.

7. The system of claim 3, wherein the processor is further configured to generate at least one MTBX Chart based on the reliability metrics.

8. The system of claim 7, wherein the at least one MTBX Chart comprises:
- an MTBX Chart showing the average value of the reliability metrics for each time interval; and
- a percentage MTBX Chart showing, for each time interval, the percentage of reliability metrics that were below a selected reliability target.

9. The system of claim 7, wherein the at least one MTBX Chart comprise:
- an MTBX Chart showing the percentile value of the reliability metrics for each time interval; and
- a percentage MTBX Chart showing, for each time interval, the percentage of reliability metrics that were below a selected reliability target.

* * * * *